United States Patent [19]
Goudeau et al.

[11] Patent Number: 5,848,093
[45] Date of Patent: Dec. 8, 1998

[54] FIBER-DRAWING FURNACE FOR DRAWING DOWN AN OPTICAL-FIBER PREFORM INTO AN OPTICAL FIBER

[75] Inventors: Jacques Goudeau; Henri Marc Michaud, both of Claremont, N.C.; Jean-Philippe Francois, Le Pecq, France; Thierry Auvray, Claremont, N.C.; Michel Hertz; Patrick McKenzie, both of Conflans Cedex, N.C.

[73] Assignee: Alcatel Alsthom Compagnie Generale D'Electricite, Paris, France

[21] Appl. No.: 998,810

[22] Filed: Dec. 29, 1997

[30] Foreign Application Priority Data

Dec. 30, 1996 [FR] France ................................ 96 16190

[51] Int. Cl.⁶ ........................................................ H05B 6/26
[52] U.S. Cl. ........................... 373/157; 373/111; 373/139; 65/499; 219/651
[58] Field of Search ..................................... 373/130, 137, 373/155, 156, 157, 162, 139, 111; 219/634, 651; 65/499

[56] References Cited

U.S. PATENT DOCUMENTS

| | | | |
|---|---|---|---|
| 4,142,063 | 2/1979 | Boniort et al. | 373/157 |
| 4,643,890 | 2/1987 | Schramm | 373/155 |
| 5,308,947 | 5/1994 | Fleming, Jr. | 219/634 |
| 5,410,567 | 4/1995 | Brundage et al. | 373/137 |

FOREIGN PATENT DOCUMENTS

| | | |
|---|---|---|
| 3025680 | 2/1982 | Germany . |
| 3731347 | 3/1989 | Germany . |
| 1517228 | 7/1978 | United Kingdom . |

OTHER PUBLICATIONS

Patent Abstracts of Japan, vol. 18, No. 568 (C–1266), 31 Oct. 1994 corresponding to JP 06 206735 A (Sumitomo Electric Ind. Ltd) dated 26 Jul. 1994.
Abstract, DE 30 25 680 A (Siemens AG).

*Primary Examiner*—Tu Ba Hoang
*Attorney, Agent, or Firm*—Sughrue, Mion, Zinn, Macpeak & Seas, PLLC

[57] ABSTRACT

The fiber-drawing furnace includes a graphite tube positioned vertically, heated by induction, and subjected internally to an inert atmosphere, said tube internally defining a fiber-drawing chamber. In the furnace said graphite tube is a double-walled tube having an inner wall and an outer wall, its inner wall is porous and separates the fiber-drawing chamber from a peripheral chamber defined between the walls and subjected to a flow of inert gas which diffuses through said porous wall into said fiber-drawing chamber. Application to drawing down an optical-fiber preform.

5 Claims, 2 Drawing Sheets

FIBER-DRAWING FURNACE FOR DRAWING DOWN AN OPTICAL-FIBER PREFORM INTO AN OPTICAL FIBER

The present invention relates to fiber drawing in which an optical-fiber preform is drawn down, and it relates more particularly to a furnace serving to perform such fiber drawing.

BACKGROUND OF THE INVENTION

In general, as is well known in practice, such a furnace is constituted by a graphite tube which is disposed vertically, and which receives the preform axially via its top end. The tube thus defines a fiber-drawing chamber around the preform. The fiber-drawing chamber, or at least its middle portion, is heated by induction to a temperature of about 2000° C. so that the bottom end of the preform can be drawn down. The preform is caused to advance axially inside the tube as it is being drawn down so that it remains positioned in the middle portion of the fiber-drawing chamber. Furthermore, in general, a flow of inert gas is created inside the fiber-drawing chamber to protect the tube from the melt vapor given off by the preform, and to avoid deposits on the inside surface of the tube. The flow of the inert gas must be strong enough to protect the inside surface of the tube effectively. It can therefore give rise to turbulence inside the chamber. Such turbulence can adversely affect the drawing down of the preform, and the diameter of the resulting fiber can then vary.

Document DE-A-37 31 347 discloses such a furnace having a vertical graphite tube whose middle portion is heated. The tube is provided with a top diaphragm through which the preform passes, and with a bottom diaphragm through which the fiber passes. The fiber-drawing chamber defined by the tube around the preform is filled with an inert gas, e.g. argon. The top end of the tube is made gastight by the top diaphragm. Gastightness may be achieved by contact between the preform and the edges of the opening through the diaphragm, but such contact might deform the preform. Gastightness is preferably achieved by the top diaphragm through which the preform passes without being in contact with it, and which is then provided internally with nozzles for injecting combustible gas that is ignited and that is directed radially onto the preform, thereby constituting a gastight barrier in the opening through the diaphragm. Such sealing configurations avoid having a flow of inert gas and turbulence in the fiber-drawing chamber, but are not always satisfactory with respect to maintaining an atmosphere inside of the fiber-drawing chamber that is inert enough to protect the wall of the graphite tube. Such sealing configurations are also relatively complex to implement.

OBJECTS AND SUMMARY OF THE INVENTION

An object of the present invention is to avoid the drawbacks of the above-mentioned known solution by protecting the graphite tube simply and effectively without giving rise turbulence in the protective gas inside the fiber-drawing chamber, and without adversely affecting drawing down of the preform.

The present invention provides a fiber-drawing furnace for drawing down an optical-fiber preform into an optical fiber, said furnace including a graphite tube positioned vertically, heated by induction, and subjected internally to an inert atmosphere, said tube internally defining a fiber-drawing chamber and receiving said preform via the top end of said chamber, wherein said graphite tube is a double-walled tube having an inner wall and an outer wall, its inner wall is made of porous graphite, a peripheral chamber is defined between its walls around the fiber-drawing chamber, and said tube is equipped to inject at least one inert gas into said peripheral chamber and to cause it to flow therein, which gas diffuses via said porous inner wall into said fiber-drawing chamber.

The furnace may also have at least one of the following additional characteristics:

it is equipped to inject a specific other gas into said peripheral chamber, which gas is chosen as a function of said preform and is then also present in said fiber-drawing chamber;

it is equipped also to inject said inert gas and/or said specific other gas into said fiber-drawing chamber; and it includes a graphite tubular insert that is cylindrical or conical, and that is mounted in the bottom portion of said fiber-drawing chamber to guide the flow of inert gas injected into said fiber-drawing chamber.

BRIEF DESCRIPTION OF THE DRAWINGS

The characteristics and advantages of the present invention appear from the following description of an embodiment shown by way of example in the accompanying drawings, in which.

MORE DETAILED DESCRIPTION

Figure 1:
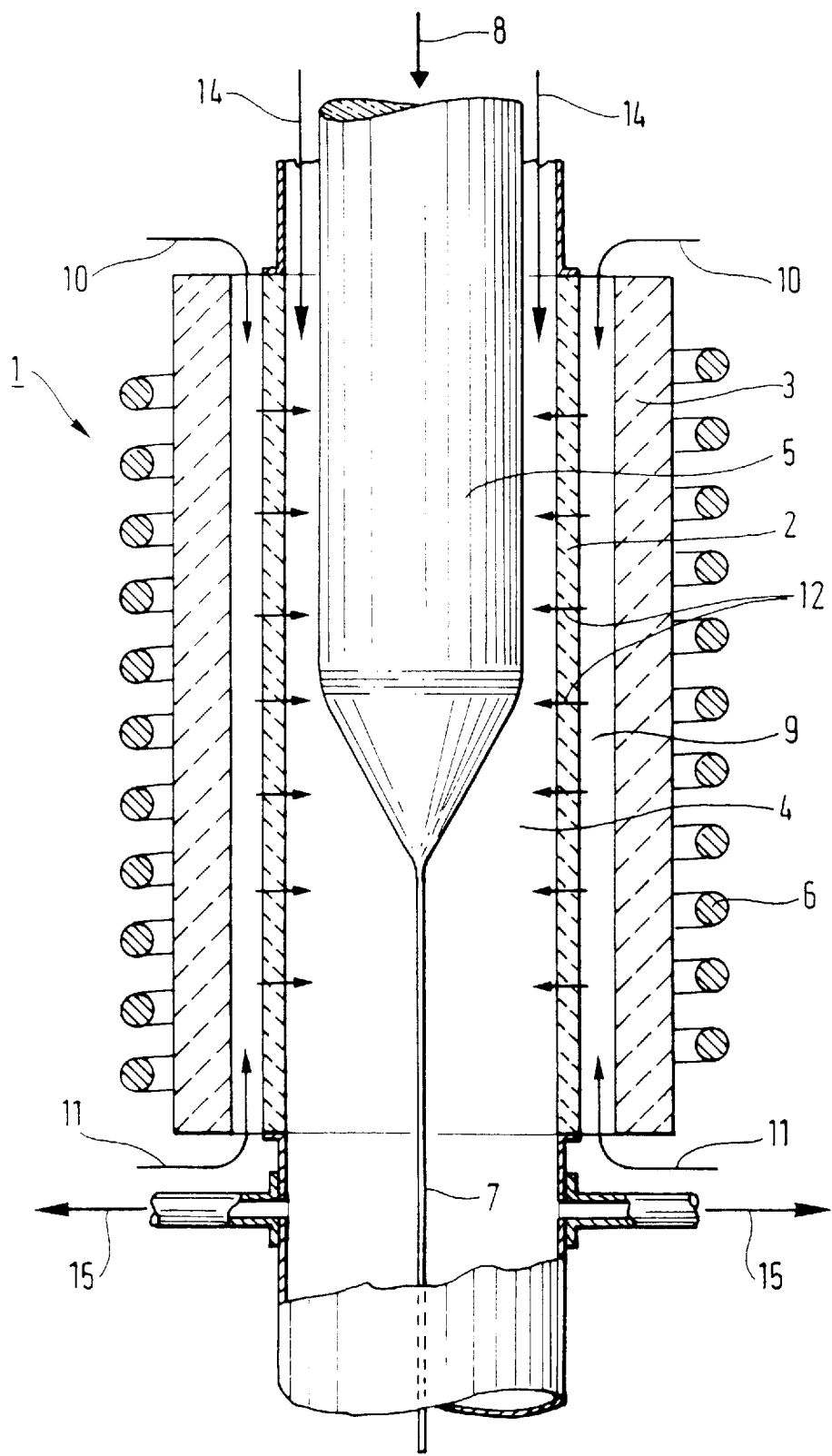
FIG. 1 shows a fiber-drawing furnace of the invention.
Figure 2:
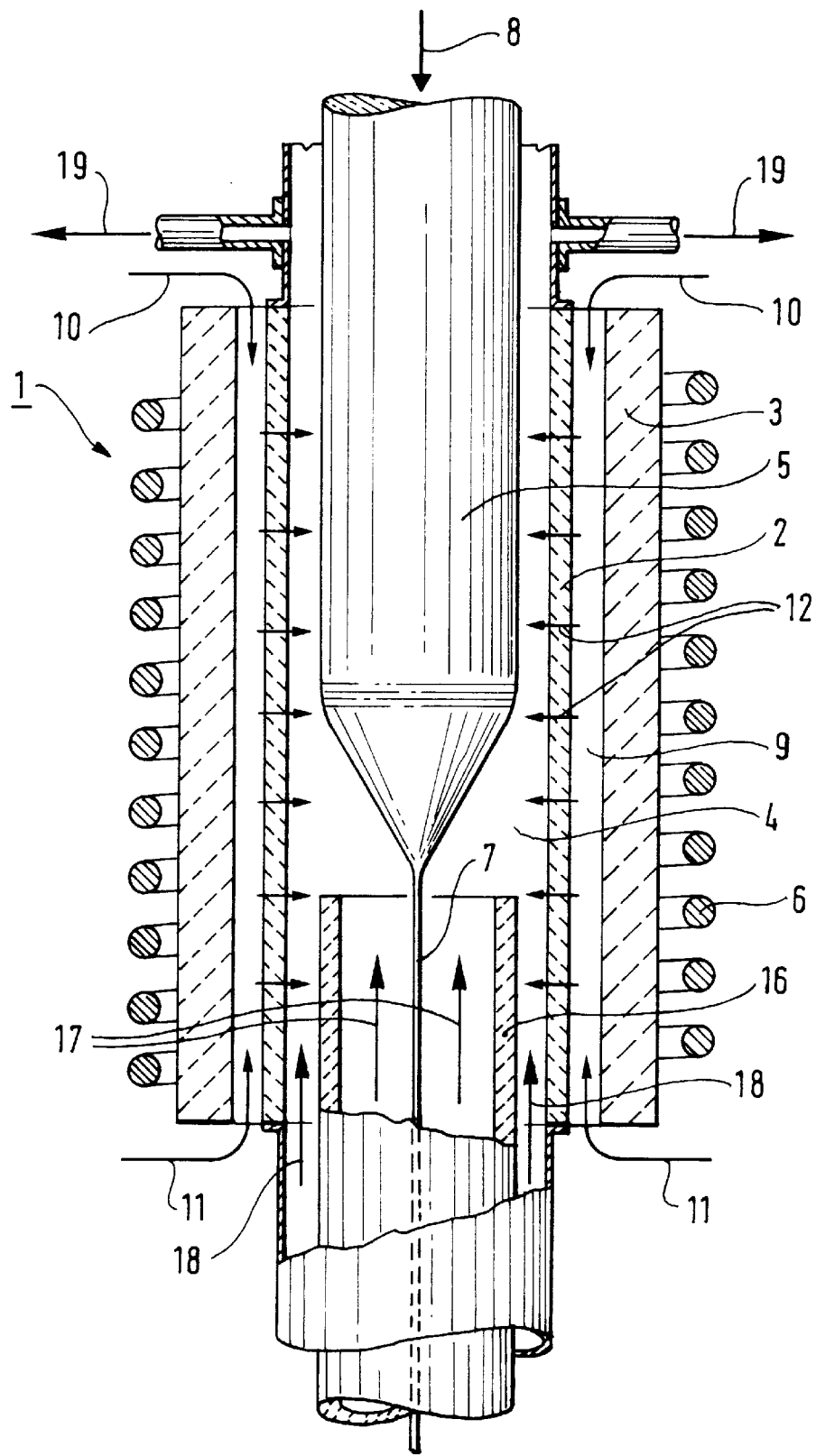
FIG. 2 shows the same furnace as "adapted".

The fiber-drawing furnace shown in FIGS. 1 and 2 includes a double-walled graphite tube 1, the two walls being referred to as an inner wall 2 and an outer wall 3. It is positioned vertically, and it defines an internal fiber-drawing chamber 4 receiving a preform 5 via the open top end of the tube. The tube is heated by induction by means of a coil 6 mounted around its periphery and passing a high-frequency electric current. The substantially middle portion of the fiber-drawing chamber is thus heated to a temperature of about 2000° C. for the purposes of softening the bottom portion of the preform, and of drawing down the bottom end thereof into a fiber 7. Known means (not shown) are associated with the preform to cause it to advance axially inside the fiber-drawing chamber in the direction indicated by arrow 8 as its bottom end is being drawn down.

The inner wall 2 of the double-walled graphite fiber-drawing furnace of the invention is porous. Between its two walls 2 and 3, the furnace defines a peripheral chamber 9 around the fiber-drawing chamber 4. The peripheral chamber serves to receive an inert gas, e.g. helium or argon, or a mixture of helium and of argon, which flows in said peripheral chamber and diffuses through the inner wall 2 to create an inert atmosphere in the fiber-drawing chamber.

The inert gas or gas mixture is injected as indicated by arrows 10 and 11 via one or more injection inlets provided at both ends of the peripheral chamber 9. In a variant, it may be injected via one end of the tube only, e.g. as indicated by arrow 10, with the other end being closed. The inert gas or gas mixture may be associated at will with a specific other gas chosen as a function of the type of preform to be drawn down and therefore of the resulting fiber, this other gas being injected via one end or both ends of the peripheral chamber, preferably independently from the inert gas or gas mixture also injected into the peripheral chamber, and it mixes therewith in said chamber 9 so that it is also present in the fiber-drawing chamber 4.

The flow of gas injected and flowing in said peripheral chamber 9 diffuses through the porous inner wall 2 of the furnace as indicated by the arrows such as 12, the flow rate through said wall being low so that the desired inert atmosphere is obtained in the fiber-drawing chamber and the inside face of the inner wall 2 is protected, while avoiding turbulence in the fiber-drawing chamber, and more particularly around the softened end of the preform that is being drawn down into a fiber.

The invention thus makes it possible to minimize the flow rate of inert gas entering the fiber-drawing chamber 4, without it being necessary to adjust very finely the flow rate of the gas injected into the peripheral chamber 9. The degree of porosity of the graphite of the inner wall 2 is chosen to obtain and maintain the inert atmosphere without turbulence in the fiber-drawing chamber. The porosity may vary along the porous wall to obtain a flow rate of inert gas that is uniform along the preform.

The porosity also makes it possible to add the specific other gas chosen as a function of the preform to be drawn down. It is very easy to inject the specific gas since it is injected into the peripheral chamber. No complex means need to be provided on the furnace for injecting it into the peripheral chamber, for controlling its own flow rate, for mixing it with the inert gas(es) or for controlling its resulting content in the inert gas(es). The specific other gas is in particular nitrogen, use of which in a fiber-drawing chamber is known.

As shown in FIGS. 1 and 2, an inert gas or an inert gas mixture may also be injected directly into the fiber-drawing chamber 4 via one of the end portions thereof and it may be extracted therefrom via the opposite end portion thereof. The extraction points are connected to an external suction system (not shown) firstly for creating suction and facilitating extraction of the gas flow, and secondly for extracting therewith the melt vapors from the preform and the dust conveyed by said vapors and to remove them to the outside.

Under such conditions, the gas injected into the chamber 9 and diffusing through the porous wall 2 creates a laminar layer for protecting the inside face of the wall 2 while the gas flow injected directly into the fiber-drawing chamber serves essentially to convey the melt vapors and the dust to the outside. The flow rate of the gas flow injected into the chamber 4 may be relatively low because the wall 2 is already protected.

In FIG. 1, the possibility of injecting the gas flow into the chamber 4 at its top end is indicated by arrows 14, and the possibility of extracting the gas flow from the bottom of the chamber 4 is indicated by arrows 15.

In FIG. 2, the fiber-drawing furnace is said to be "adapted". It includes a tubular or conical graphite insert 16 disposed axially in the bottom portion of the chamber 4, just below the preform, the tubular insert being cylindrical or conical over at least a portion of its length, the large base of the conical insert being situated closer to the preform.

Arrows 17 and 18 indicate the possibility of injecting the gas flow into the fiber-drawing chamber on either side of the insert 16, and arrows 19 indicate that it can be extracted at the top of the fiber-drawing chamber 4. The gas flow injected in this way is guided by the insert, with different flow rates being possible on either side thereof so as to control flow conditions.

The gas injected as indicated by arrows 18 between the insert and the porous wall 2 may come from the peripheral chamber, in which case it is diffused through the porous wall 2.

The gas injected on one side of the insert may be different from the gas injected on the other side thereof, or different from the gas injected into the chamber 9.

Such a fiber-drawing furnace as shown in FIG. 1 or 2 makes it possible to save time during the preparatory steps of drawing down a preform into a fiber, to obtain a constant fiber diameter throughout fiber drawing, and to obtain higher efficiency and improvements in productivity by means both of the quality of the fiber drawing achieved and of the low flow rate of gas in the fiber-drawing chamber. The extra cost involved in making it is amply compensated by the advantages obtained.

We claim:

1. A fiber-drawing furnace for drawing down an optical-fiber preform into an optical fiber, said furnace including a graphite tube positioned vertically, heated by induction, and subjected internally to an inert atmosphere, said tube internally defining a fiber-drawing chamber and receiving said preform via the top end of said chamber, wherein said graphite tube is a double-walled tube having an inner wall and an outer wall, its inner wall is made of porous graphite, a peripheral chamber is defined between its walls around the fiber-drawing chamber, and said tube is equipped to inject at least one inert gas into said peripheral chamber and to cause it to flow therein, which gas diffuses via said porous inner wall into said fiber-drawing chamber.

2. A fiber-drawing furnace according to claim 1, provided with at least one gas injection inlet via which gas is injected into said peripheral chamber, at least one such inlet being provided at at least one of the ends of said tube.

3. A fiber-drawing furnace according to claim 2, equipped to inject a specific other gas into said peripheral chamber, which gas is chosen as a function of said preform and is then also present in said fiber-drawing chamber.

4. A fiber-drawing furnace according to claim 1, equipped also to inject a flow of inert gas into said fiber-drawing chamber via one of the ends thereof, and to extract said flow of inert gas therefrom via the opposite end thereof.

5. A fiber-drawing furnace according to claim 4, including a graphite tubular insert that is cylindrical or conical over at least a portion of its length, and that is mounted axially in the bottom portion of said fiber-drawing chamber to guide the flow of inert gas then injected into said fiber-drawing chamber via the bottom end thereof and on at least one side of the insert.

* * * * *